May 30, 1944. J. A. HERRINGTON 2,350,034
TOGGLE CLAMP
Filed July 27, 1942
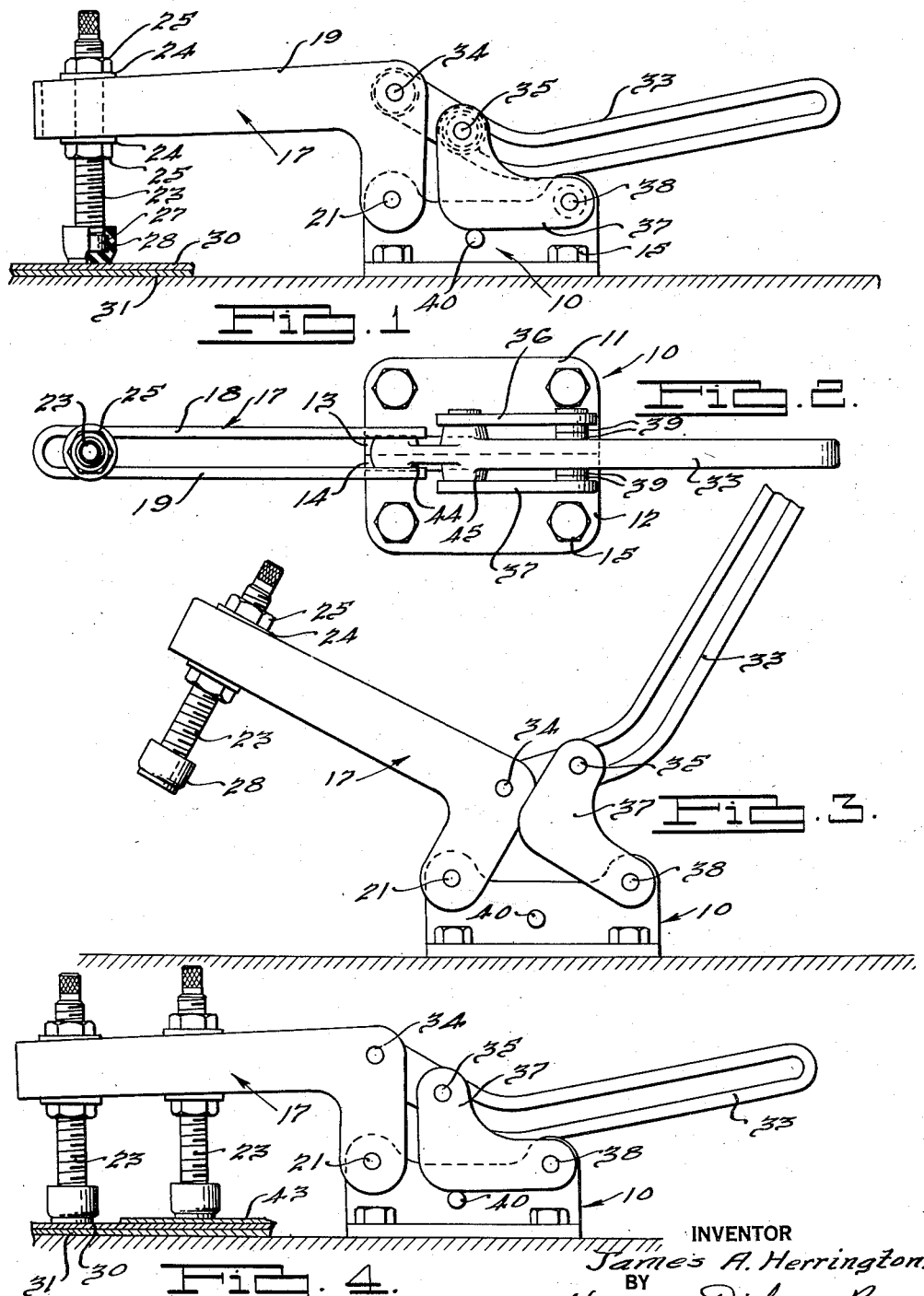
INVENTOR
James A. Herrington.
BY
Harness, Dickey & Pierce
ATTORNEYS.

Patented May 30, 1944

2,350,034

UNITED STATES PATENT OFFICE 2,350,034

TOGGLE CLAMP

James A. Herrington, Detroit, Mich., assignor to Knu-Vise, Incorporated, Detroit, Mich., a corporation of Michigan Application July 27, 1942, Serial No. 452,541

1 Claim. (Cl. 144—290)

The invention relates generally to clamping devices, and it has particular relation to clamping devices which may be quickly and positively applied for the purpose of holding a plurality of parts in position.

One object of the invention is to provide an improved and efficient clamp for the purpose mentioned which can be manufactured and assembled economically.

Another object of the invention is to provide an improved and sturdy clamp which can be quickly applied for holding parts together and which is further characterized by the fact that the parts are held very positively in position.

Another object of the invention is to provide an improved clamp having an arm or member provided with one or more clamping elements which can be adjustably positioned along the arm.

Another object of the invention is to provide an improved clamp wherein a clamp member is held in clamping position by an improved toggle arrangement which secures very positive clamping action.

Other objects of the invention will become apparent from the following specification, from the drawing relating thereto, and from the claims hereinafter set forth.

For a better understanding of the invention, reference may be had to the drawing, wherein:

Figure 1 is a side-elevational view of a clamp constructed according to one form of the invention, with the clamp in operative position;

Fig. 2 is a plan view of the structure shown by Fig. 1;

Fig. 3 is a side-elevational view of the clamp in its released condition; and

Fig. 4 is a view on the order of Fig. 1, wherein the clamp is provided with a plurality of clamping elements of adjustable character.

Referring to Figs. 1 and 2, the clamp includes a base 10 which comprises two parts 11 and 12 having upstanding and adjacent flanges 13 and 14. These flanges may be spot or otherwise welded together, so that the parts 11 and 12 are unitarily connected. Bolts 15 are employed for fastening the base to any suitable support.

At the left end of the base, a clamping member or arm 17 is provided and, as best shown by Fig. 2, this arm comprises a U-shaped strap, thereby providing side strap portions 18 and 19 disposed in spaced and parallel relation. The free ends of the two strap portions 18 and 19 straddle the joined flanges 13 and 14 on the base at the left end of the latter, and a pin 21 pivotally connects the ends of the strap portions to such flanges. It will be observed in Fig. 1 that the arm 17 extends upwardly from pivot point 21 and then substantially at right angles to the upwardly directed portion, so that the arm is angular in shape.

A threaded clamping post or element 23 extends vertically between the strap portions 18 and 19 and, at upper and lower sides of the latter, washers 24 and nuts 25 are provided for the purpose of positively clamping the post in position on the arm 17 while allowing vertical adjustment thereof, as desired. The lower end of the post is provided with an enlargement 27, having a rubber tip 28 thereon, and this tip is adapted to engage parts 30 and 31, for example, so that these parts may be held in clamped relation. It will be apparent from the description that the clamping post 23 may be adjusted vertically through the arm 17 and that it may be shifted longitudinally of the arm to any position. It might further be noted that the connecting bend at the outer end of the arm prevents the threaded post 23 from becoming separated from the arm through any handling of the device and, at the same time, the bend serves as a bridge for laterally bracing the arm.

For moving the arm 17 into and out of clamping position, a handle 33 is provided which is pivotally connected as indicated at 34 to the two strap portions 18 and 19 of the clamping arm substantially at the upper end of the upstanding part of the latter. This handle, at a point spaced from the pivot 34, is pivotally connected, as indicated at 35, to a pair of link straps 36 and 37, which straddle the handle, and opposite ends of the link straps 36 and 37 straddle the upstanding flanges 13 and 14 on the base at the right end of the latter. A pin 38 pivotally connects the straps to the flanges 13 and 14, and washers 39 are used to properly separate the straps. A link 40, extending through the upstanding flanges 13 and 14 on the base, serves to limit downward movement of the link straps 36 and 37 and, consequently, downward movement of the handle 33. It will be observed that, when the handle and the link straps reach this limited position, the pivot points 34, 35, and 38 are substantially in alignment, with the pivot point 35 located intermediate the other two pivot points.

With the clamping device in operative position, as shown in Fig. 1, and with the pivot points 34, 35, and 38 substantially in alignment, the outer end of the clamping arm 17 is positively held against upward movement, since upward movement is entirely prevented by the fact that the pivot pin 35 is substantially in alignment with the pivot pins 34 and 38. For any such upward movement to occur, either the link straps 36 or 37 would have to rock downwardly or upwardly about the pivot pin 38 and, in view of the fact that the link straps are in contact with the limiting pin 40, downward rocking of the link straps is positively prevented. For any rocking of the link straps upwardly to occur, some force would be required to break the toggle upwardly; but, since any tendency of the arm 17 to move upwardly applies a force substantially in alignment with the pivot pins 34, 35, and 38, there is no moment arm present to swing the link straps upwardly.

When it is desired to release the clamping device, the arm 33 is lifted so as to break the toggle, and this automatically moves the clamping arm about the pivot 21 and into releasing position. Fig. 3 shows the relation of parts when the arm has been raised. It might be noted here that the link-straps 36 and 37 are sufficiently spaced that they can straddle the strap portions 18 and 19 of the clamping arm, and hence it is even possible to raise the arm 33 sufficiently that it will engage the end of the threaded post 23. In other words, as seen in Figure 3, the arm 17 and the handle 33 can be brought substantially into vertical positions, with the upper end of the threaded pin 23 contacting the handle.

The structure shown by Figure 4 is like that shown by Figure 1, with the exception that two of the threaded clamping elements 23 are provided on the arm 17. One of these clamping elements may be employed, as stated previously, to hold the parts 30 and 31 together, and the other clamping element 23 may be employed, for example, to hold an additional element 43 in clamped position on the first parts. Various applications of the clamping device, through using a plurality of clamping elements 23, adjustable vertically and lengthwise of the arm 17, will be readily recognized by those working in this art.

The clamping device described and illustrated may be constructed inexpensively and economically, and the parts may be readily assembled. The arm 17 may be constructed of a strip of sheet metal, the base may be constructed of sheet metal parts brought together and welded, and the link-straps 36 and 37 may comprise sheet metal parts. The arm 33 may be a forging and, in forming it, bosses 44 and 45 may be provided for spacing the strap portions 18 and 19 and the strap elements 36 and 37 at the pivot points.

It is apparent, from the drawing and from the description, that a very strong force may be applied for clamping purposes at the outer end of the arm 17, through a downward movement of the handle 33. Such downward movement of the handle 33 operates a toggle, or, in other words, moves the intermediate pivot point 35 substantially into alignment with the pins 34—38 and final movement of the handle into its operative position, as seen in Fig. 1, applies great force against the pin 34 without requiring much force on the handle. Also, it will be appreciated that the character of the clamping arm 17 permits using a plurality of clamping elements, located adjustably along the length of the arm, and that the nature of each clamping element disclosed enables adjusting the clamping elements themselves vertically or transversely of the clamping arm. All in all, the clamping device is a simple but sturdy structure, capable of rapid and positive action.

Although only one form of the invention has been illustrated and described in detail, it will be apparent to those skilled in the art that various modifications may be made without departing from the scope of the inventor's claim.

What is claimed is:

A clamping device comprising a base, an L-shaped clamping arm made of an elongated U-shaped strap having its free ends pivotally connected to the base at one point with the pivot passing laterally through the strap ends, a clamping element at the other end of said clamping arm extending through the bight of the U-shaped strap and connected thereto, a handle having its end pivotally connected at a point located in the bend of the L of said clamping arm, a link having one end pivotally connected to said base and the other end pivotally connected to said handle at a point between the pivotal connection of the handle to the clamping arm and the pivotal connection between the link and the base, whereby when the parts are in clamping position the pivotal connections between one end of the link and the base, the handle with the clamping arm, and the handle with the other end of the link, lie in substantial alignment, the pivotal connection between the handle and said other end of the link being intermediate the other of said pivotal connections, and means on said base for limiting the movement of said link and clamping arm to the clamping position.

JAMES A. HERRINGTON.